Oct. 10, 1933.  A. B. JARVIS  1,929,818
PLURALITY PART SIDE DROP TRUCK PLATFORM
Filed Oct. 6, 1931  2 Sheets-Sheet 1
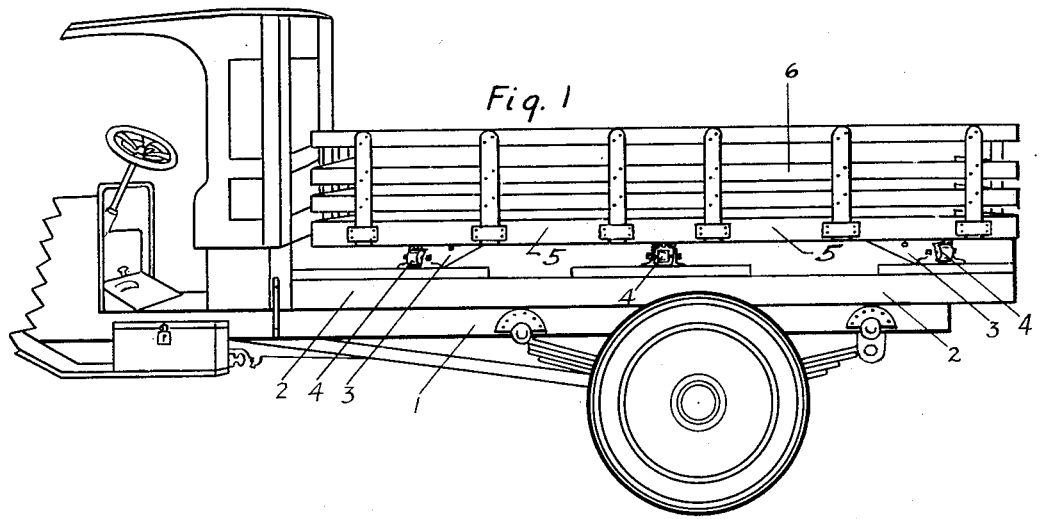
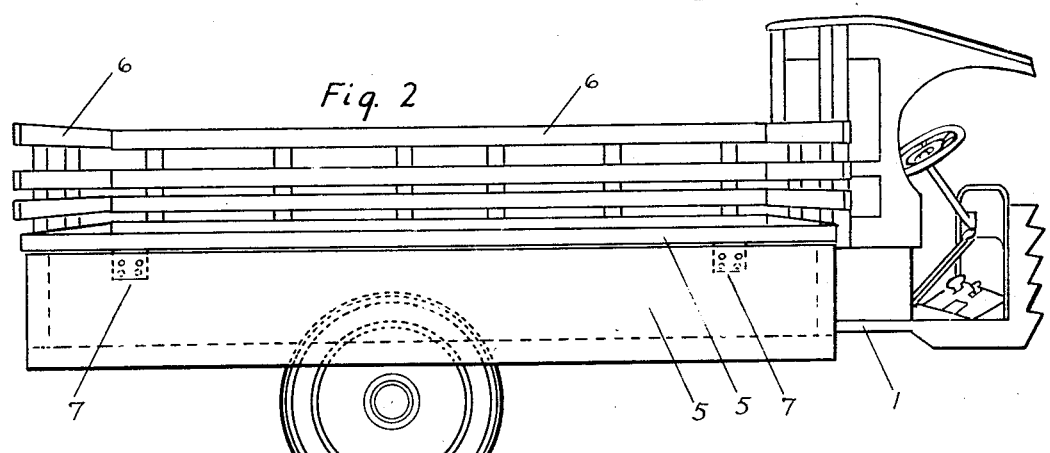
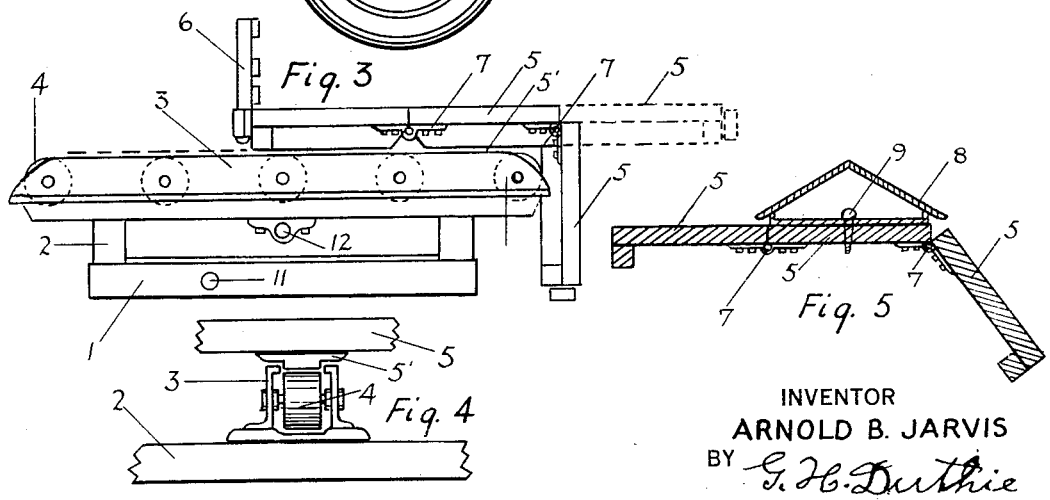
INVENTOR
ARNOLD B. JARVIS
BY
ATTORNEY Oct. 10, 1933.  A. B. JARVIS  1,929,818
PLURALITY PART SIDE DROP TRUCK PLATFORM
Filed Oct. 6, 1931  2 Sheets-Sheet 2
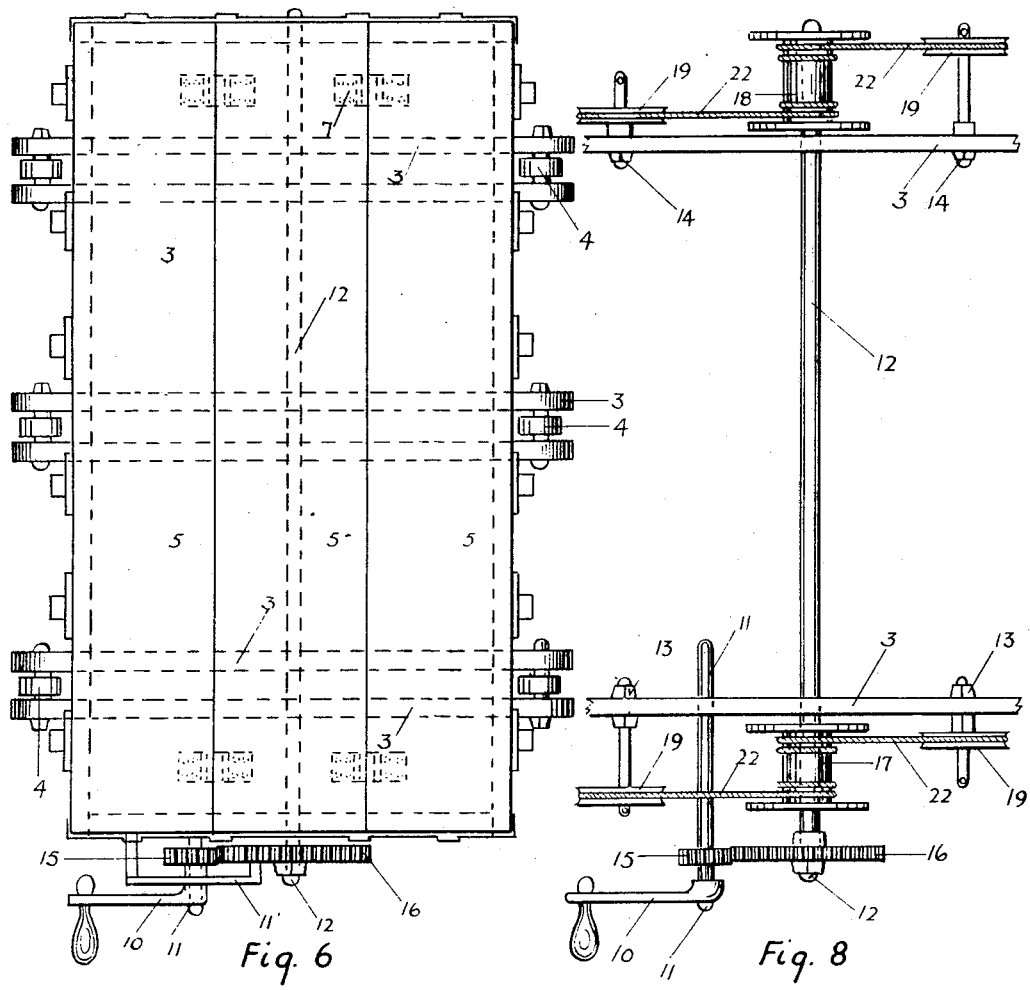
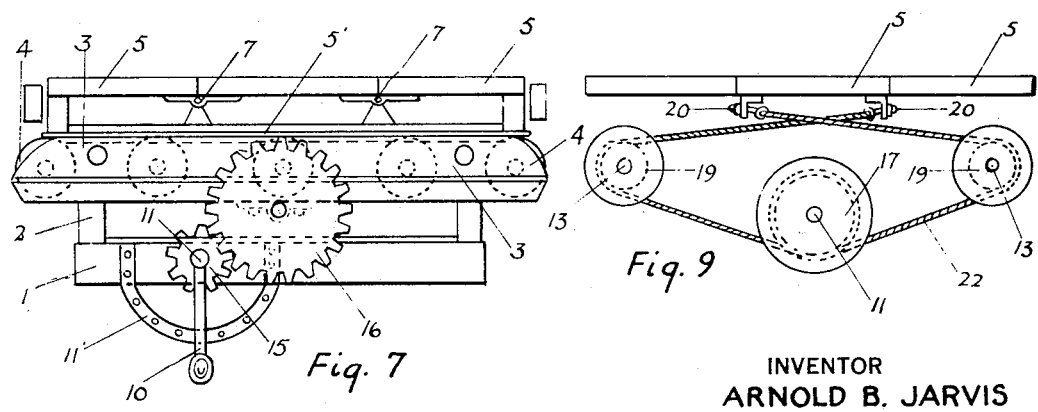
INVENTOR
ARNOLD B. JARVIS
BY G. H. Duthie
ATTORNEY Patented Oct. 10, 1933

1,929,818

UNITED STATES PATENT OFFICE 1,929,818

PLURALITY PART SIDE DROP TRUCK PLATFORM

Arnold B. Jarvis, Clarksburg, W. Va.

Application October 6, 1931. Serial No. 567,175

1 Claim. (Cl. 298—13)

This invention relates to certain new and useful improvements in the construction and operation of truck platforms.

The main object of my invention is the construction of a truck platform having means for easy operation when loading and unloading pressed brick, tile and other materials that necessarily have to be handled with care.

A further object of this invention is the construction of a truck platform that can be reduced in width at either side, and otherwise made easy for one man to load and unload materials that have to be handled with care.

A still further object is the construction of a truck-platform, or body bottom, adapted to be easily shifted to the right or left upon the truck frame, and adapted for side dumping of coal, cinders and other loose materials.

With the above and other objects in view, as will more fully appear as the description proceeds, it will be observed that my invention consists of new and novel construction, combination of parts, and operating devices as will hereinafter be fully illustrated, described and claimed. It is to be understood, however, that several changes may be made in the construction and operation of my improved truck platform without departing from the spirit and intent thereof.

I attain these objects by the construction of a truck platform longitudinally divided into plurality parts attached to each other by hinges, and the mechanism illustrated in the accompanying drawings, in which:—

Fig. 1 represents a side elevation of a motor truck upon the frame of which my plurality part side shifting truck platform and cross carrying devices are mounted.

Fig. 2 represents the reverse side elevation of the motor truck with the side guards removed and the truck body mechanically moved to one side by reason of which a portion of the truck platform drops downward.

Fig. 3 represents an enlarged rear end and elevation of the divided and hinged together truck platform and the roller track guide bolster as mounted upon the truck frame, showing the right side portion of the platform in the dropped hanging position.

Fig. 4 represents the end view of the roller guide track bolster, upon which the divided platform is shifted to the right or left side of the truck.

Fig. 5 represents a cross section of the platform having the sides and end guards removed, and showing the detachable three sided floor member placed upon the center portion of the platform by means of which, and the slanting position of a part of the platform, coal and other loose materials slide and fall to the side of the truck.

Fig. 6 represents the top plan view of the truck platform divided into a plurality of parts.

Fig. 7 represents the rear end of the truck platform when in a central position, with the crank, gear and rope means for moving the truck platform to the right or left upon the roller guide track.

Fig. 8 represents the plan view of the crank, gear, shaft drums, sheaves and wire rope connections as they appear immediately underneath the divided truck platform, and by means of which the said platform is moved to the right or left upon its track at the will of the operator.

Fig. 9 represents the end view of Fig. 8 devices showing the connection and relation of the wire ropes as attached to the center portion of the truck platform, and extending to the right and left around the sheaves and winding drums.

Referring to the drawings similar numerals refer to similar parts throughout the several views.

Numeral 1 designates the motor truck chassis; numeral 2 designates the truck body frame; 3 track guide bolsters extending crosswise upon the truck frame; 4 track rollers within the bolsters; numeral 5 designates a platform divided into a plurality of parts; 5' platform cross track guide; 6 the side and end guards removably attached to the sides and ends of the platform; 7 hinges by means of which the parts of the platform are attached to each other; 8 a detachable three sided platform member, adapted to be placed longitudinally upon the center portion of the platform; 9 dowel pins by means of which each end of the three sided floor member is held in the proper position upon the platform, as shown in Fig. 5.

Numeral 10 hand crank; 11 crank shaft; 11' crank quadrant; 12 main shaft extending longitudinally below the center portion of the platform and attached by journals to the bottom of the track guide bolsters; 13 sheave bracket shafts rigidly attached to the side of the rear track guide bolster; 14 sheave bracket shafts attached to the side of the front track guide bolster; 15 crank shaft pinion; 16 main shaft gear wheel, which engages the pinion; 17 the rear rope winding drum; 18 the front rope winding drum; 19 rope sheaves mounted upon the sheave bracket shafts; 20 and 21 eye bolts attached at each end and the bottom of the center portion of the platform; 22 wire ropes one end of which is rigidly attached to the eye bolts and extend in opposite direction to and around the sheave carriers, thence to and around their respective drums and the other ends of the said wire ropes are rigidly attached to the said rope winding drums as shown in Figs. 8 and 9.

It will be observed that in the use and operation of my truck platform the platform when in a central position upon the roller track bolsters, the truck can be used for all purposes the same as trucks having stationary one piece platforms. When loading and unloading pressed brick or other material necessary to be handled with care, my improved platform has special advantages. The operator may by means of the rear crank, and my platform shifting devices, move the platform to the right or left upon the roller track bolsters to the position when the outer portion of the platform drops downward in a slanting or vertical position as shown in Figs. 3 and 5.

It will be observed further that when my platform is in the aforesaid narrowed position one man can easily place brick or other material upon the far side of the platform. When the level portion of the platform is fully loaded, the operator by means of turning the crank in the opposite direction moves the truck platform back to a central position as shown in Figs. 6 and 7, and proceeds to load the remaining portion of the platform, after which the side guards may be placed in their usual position. The same advantages are obtained when unloading.

It will be observed further that when using my improved truck platform in transferring coal cinders and other loose material the operator will place my detachable three sided platform member upon the center portion of the platform as shown in Figure 5, after which the truck may be loaded with coal or other loose material, and when ready to be unloaded the operator will first remove one of the side guards and by means of the crank and shifting devices the platform is shifted to the side from which the side guard has been removed. When the outer portion of the platform drops downward in a slanting position as shown in Fig. 5 the larger portion of the unloaded material will slide and be dumped to the side and entirely clear of the truck, after which the operator by means of said crank and connections shifts the platform with the remaining load partly to the opposite side of the truck and removes the side guard. He will then by means of said crank shift the platform further until the outer portion drops in a proper slanting position when the remaining portion of the load will be entirely dumped at the other side and clear of the truck.

It will be observed still further that my improved platform is especially adapted for unloading or dumping the loaded materials to one or both sides of a driveway or track, leaving the truck free to back or go forward between the unloaded materials.

Having fully described my new and improved truck platform with its shift and control devices, what I claim as new and desire to secure by Letters Patent is:—

A truck platform of the character described, consisting of a platform divided longitudinally into a plurality of parts, having the said parts attached to each other by means of hinges; roller track supports spaced apart and mounted crosswise upon the truck frame, and means for moving the platform to the right or left upon the roller tracks, the side parts of the platform being adapted when so moved to drop downward in a slanting or vertical position; a detachable three sided platform member mounted upon the center part of the platform, and adapted by means of its slanting side to aid in unloading materials from the truck.

ARNOLD B. JARVIS.